June 26, 1956  F. H. HOREY  2,751,865
TRANSPLANTER

Filed Sept. 23, 1952  2 Sheets-Sheet 1

INVENTOR.
FRANK H. HOREY
BY
ATTORNEYS

June 26, 1956 F. H. HOREY 2,751,865
TRANSPLANTER
Filed Sept. 23, 1952 2 Sheets—Sheet 2
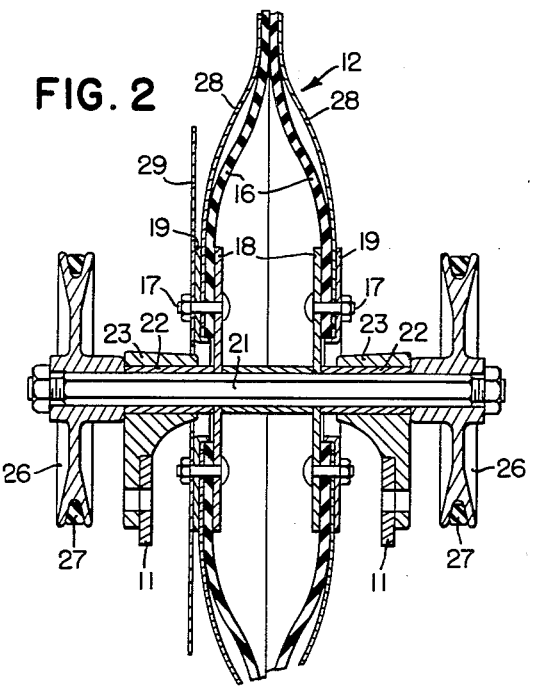
FIG. 2
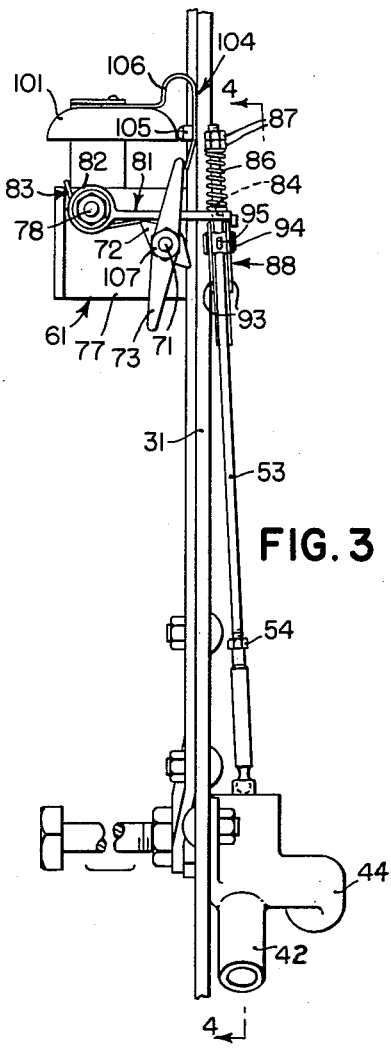
FIG. 3
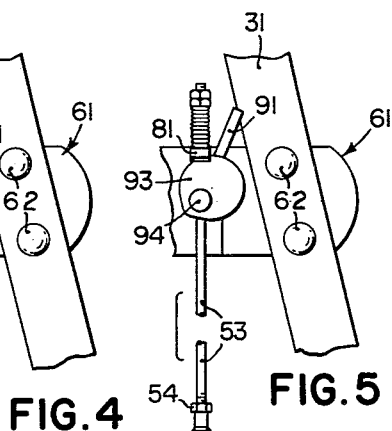
FIG. 4  FIG. 5
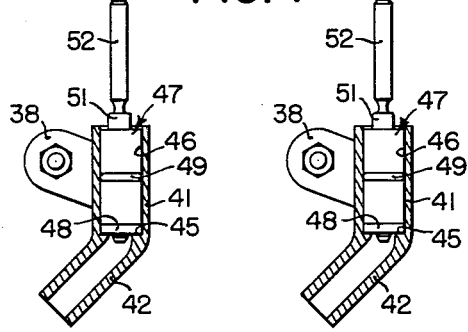
INVENTOR.
FRANK H. HOREY
BY
ATTORNEYS

United States Patent Office 2,751,865
Patented June 26, 1956

2,751,865

TRANSPLANTER

Frank H. Horey, Yakima, Wash., assignor to Deere & Company, Moline, Ill., a corporation of Illinois Application September 23, 1952, Serial No. 311,084

5 Claims. (Cl. 111—2)

The present invention relates generally to agricultural implements and more particularly to implements in the nature of transplanters, particularly adapted for setting out nursery-grown plants and/or other transplantable crops.

The object and general nature of the present invention is the provision of a simple and sturdy bell timer and water valve actuating apparatus for transplanters and the like. More particularly, it is an important feature of this invention to provide a new and improved water valve actuating mechanism especially constructed to provide easily controlled means for shutting off the flow of water whenever desired, as when turning at the end of the field.

These and other objects and advantages of the present invention will be apparent to those skilled in the art after a consideration of the following detailed description, taken in conjunction with the accompanying drawings, in which:

Figure 2 is a fragmentary sectional view taken along the line 2—2 of Figure 1.

Figure 3 is a view taken generally along the line 3—3 of Figure 1.

Figure 4 is a view, partially in section, taken generally along the line 4—4 of Figure 3 showing in particular the means provided for holding the water valve in closed position irrespective of the operation of the water valve actuating mechanism.

Figure 5 is a view, partially in section, similar to Figure 4 showing the position of the parts when the water valve is held in its closed position.

Figure 1:
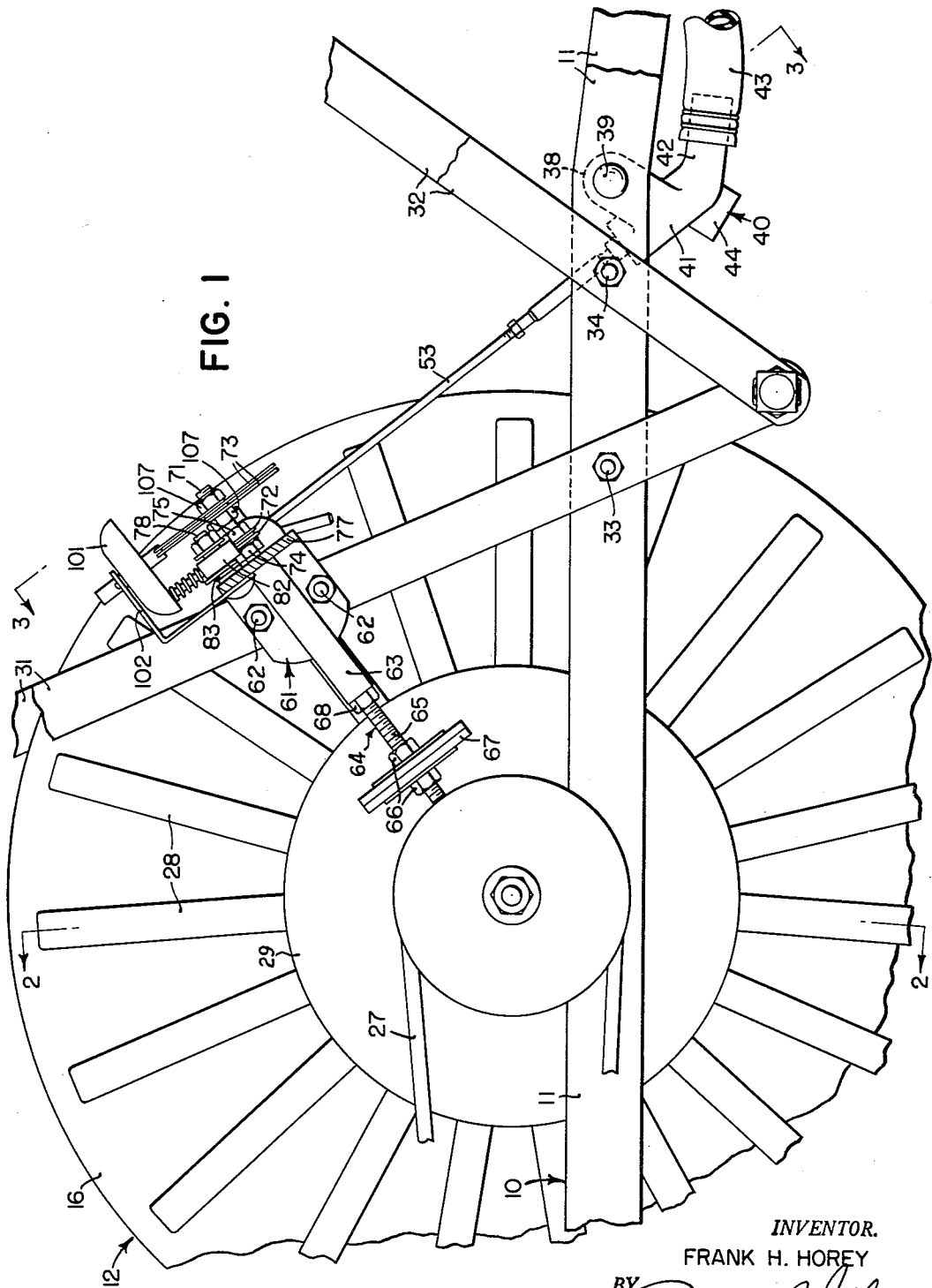
Figure 1 is a partial side view of a transplanter in which the principles of the present invention have been incorporated.

Referring first to Figures 1 and 2, the present invention has been shown for purposes of illustration as incorporated in a transplanter of the type that includes a main frame 10, comprising a pair of laterally spaced apart, generally fore-and-aft extending frame bars 11 between which a planting wheel unit 12 is mounted for rotation. The unit 12 is preferably driven by the ground wheels on which the rear portion of the frame 10 is supported, as in U. S. Patent 2,348,787, issued May 16, 1944, to H. P. Cordes, for example, the ground wheels serving also as press wheels for the transplanter. As best shown in Figure 2, the planting wheel unit includes a pair of circumferentially continuous, generally flat rubber-like disks 16 secured, as by bolts 17, to inner and outer rings 18 and 19 mounted in any suitable way on an axle 21. The latter is generally polygonal in cross section and is disposed within tubular bearing sleeves 22 that are supported for rotation, as by brackets 23 fixed to the frame bars 11 on the frame 10. Fixed to each end of the axle 21 is a pulley 26, each of which receives a driving belt 27 that is trained over a similar pulley fixed to the associated ground wheel. The peripheral portions of the disks 16 are urged yieldably into contact by spring means 28 clamped between the associated rings 18 and 19, and the bolts 17 at one side of the planting wheel unit also serve as means for fixing a flat driving disk 29 to the planting wheel unit. The frame 10 also includes suitable brace bars 31 and 32 connected to the horizontal frame bars 11 by bolt means 33 and 34. The rear braces 31 form a part of the means for supporting the plant trays, and the front braces form a part of the means supporting the seats for the transplanting operators.

Mounted on the frame 10 of the transplanter is a water valve unit 40. The latter unit includes a casing 41 having an apertured ear or bracket 38 that is fixed, as by a bolt 39, to the frame 10. The valve casing 41 also has an inlet 42, to which water is delivered from a suitable container (not shown) by a tube 43, and an outlet 44 that is tapped internally as to receive a nozzle or the like. The valve casing or housing 41 is of chambered construction and includes a valve seat 45 and a generally cylindrical portion 46 in which a valve plunger 47 is disposed. A flat disk 48 is secured to the inner end of the plunger 47 and serves as a valve closure cooperating with the seat 45. The plunger 47 is grooved to receive a sealing ring 49, and the outer end of the plunger includes a swaged portion 51 in which the ball end of a valve stem member 52 is received. The outer end of the member 52 is screw-threaded to receive the lower end of a reciprocable actuating rod 53, the two parts being held in the desired position of adjustment by a lock nut 54.

A supporting bracket 61 is provided for attachment to the brace 31, as by a pair of bolts 62. Secured, as by welding, to the base portion of the bracket is a tubular member 63 in which a rotary shaft 64 is mounted for rotation. The inner end of the shaft 64 is screw-threaded, as at 65, and receives a pair of lock nuts 66 between which a friction drive wheel 67 is disposed. An abutment, preferably in the form of a nut 68 screwed up against the end of the screw-threaded portion 65 is carried by the shaft 64 at one end of the tube 63. At the other end the shaft 64 is provided with a screw-threaded portion 71 and carries water valve actuating cam fingers 72 and bell ringing cam fingers 73. Each is apertured to receive the threaded portion 71 of the shaft 64 and normally cam fingers 72 are held in fixed relation, with respect to the shaft, by a pair of lock nuts 74 and 75 and cam fingers 73 are held by a pair of lock nuts 107. The lock nut 74 cooperates with the nut 68 in holding the shaft 64 against axial displacement relative to the supporting bracket sleeve or tube 63.

The cam fingers 72, when the shaft 64 is rotated, act through mechanism, now to be described, by which the valve stem rod 53 is reciprocated at least once for every revolution of the shaft 64. For this purpose, the bracket 61 is formed with an angular section 77 to which a pivot member 78 is fixed. Mounted on the pivot 78 is a valve-actuating arm 81 having an eye portion 82 rockably carried on the pivot 78. The arm 81 is biased for movement in one direction by a coil spring 83 one end of which engages the bracket 61 and the other end of which engages the arm 81. The outer end of the latter arm is apertured, as at 84, to receive the upper portion of the valve rod 53, which passess through the aperture 84. The outer end of the rod 53 receives a compression spring 86, the outer end of which bears against a pair of lock nuts 87 and the other end of which bears against the upper face of the arm 81. The lower face of the arm 81 bears against a manually positionable cam abutment 88 which comprises a short section of rod 91 and a pair of cam plates 93 welded in spaced apart relation to the rod 91, which latter part serves as a handle. The plates 93 are apertured to receive the pivots of a trunnion member 94 that is disposed on the rod 53 and held in position thereon by any suitable means, such as a cotter 95 or the like, as best shown in Figure 3. Normally the spring 83 holds the arm 81 down against the cams 72, and in the position of the cams 72 shown in Figure 3, the valve-actuating arm 81, acted on by its springs 83, holds the water valve 40 closed.

In operation, rotation of the shaft 64, effected by virtue of contact of the driving wheel 67 with the disk 29, acts through the cam fingers 72 to oscillate the arm 81. The cam fingers 72 may be arranged in a position closely adjacent one another, in which case the arm 81 is lifted once for each revolution of the shaft 64, but if the cam fingers are arranged in circumferentially or angularly spaced relation, the arm 81 will be actuated a plurality of times for each revolution of the shaft 64.

When it is desired to throw the water valve 40 out of operation, all that it is necessary to do is to turn the member 88 on its pivots, and against the action of the spring 86, so as to move the arm 81 upwardly relative to the rod 53, whereby the arm is in a position permitting the valve to close, even though the high point of one of the cam fingers 72 lies against the underside of the arm 81. This position of the several parts is shown in Figure 5.

According to the principles of the present invention, means are provided on the shaft 64 for also actuating an alarm, such as a bell or the like. Referring first to Figures 1 and 3, it will be seen that a bell 101 is mounted on a bracket 102 that is carried by the bracket 61. The bell is sounded by means of a clapper 104 having a striker button 105 carried on a spring 106. An end of the latter lies in the path of movement of the plurality of cam-like fingers 73, the latter being fixed in the desired angularly spaced apart relation to the shaft by a pair of lock nuts 107. Like the cam fingers 72, if only one actuation of the bell is desired for each revolution of the shaft 64, the fingers 73 are arranged in contiguous relation, but if more than one actuation of the bell is desired, the fingers 73 are spaced apart angularly by loosening the nuts 107, shifting the fingers 73 to the desired position and then re-tightening the nuts 107.

While I have shown and described above the preferred structure in which the principles of the present invention have been incorporated, it is to be understood that my invention is not to be limited to the particular details, shown and described above, but that, in fact, widely different means may be employed in the practice of the broadest aspects of my invention.

What I claim, therefore, and desire to secure by Letters Patent is:

1. A transplanter including frame means, a rotatable shaft, a shaft support on said frame means rotatably receiving said shaft, a valve-operating member movably mounted on said shaft support and actuated by movement of said shaft, a spring acting between said valve-operating member and said valve and serving normally to transmit movement of said valve-operating member in one direction to said valve, and controllable means connected with said valve-operating member and acting against said spring for holding said valve closed notwithstanding movement of said valve-operating member in said one direction.

2. A transplanter including frame means, a driven part carried by said frame means and operated by movement of said transplanter, a water valve carried by said frame means, a reciprocatory part movably mounted on said frame means and connected with said water valve for opening and closing the latter, an abutment on said reciprocatory part in a position to receive one side of said driven part, a compression spring mounted on said reciprocatory part and connected at one end to said latter part and bearing at its other end against the other side of said driven part, and means acting between said reciprocatory part and said abutment for shifting the latter relative to the reciprocatory part so that the valve may remain closed irrespective of the position of said driven part.

3. A transplanter comprising frame means, a water valve carried by said frame means, a rotatable shaft, support means rotatably receiving said shaft and carried by said frame means, means carried by said frame means for driving said shaft, an oscillatable arm pivotally mounted on said support means, a cam-like member on said shaft for actuating said oscillatable arm by rotation of said shaft, a valve-operating rod extending adjacent said arm and movably carried by said frame means, and means including disconnect means connecting said arm with said valve-actuating rod, said disconnect means including a part carried by said rod and acting against said arm for holding the latter away from said cam-like member.

4. A transplanter comprising frame means, a bracket fixed to said frame means, a rotary shaft carried by said bracket, cam elements on said shaft, and oscillatable arm pivotally mounted on said bracket and including an apertured portion, said cam elements being engageable with said arm for oscillating the latter, a water valve carried by said frame means, a valve-actuating rod extending through the apertured portion of said arm and connected with said water valve, a spring carried by said rod and bearing against one side of said arm, and an adjustable abutment carried by said rod and engageable with the other side of said arm, said abutment being adjustable into one position to provide for holding said valve closed in any position of said oscillatable arm.

5. A transplanter as defined in claim 4, further characterized by spring means carried by said bracket and acting through said arm and said abutment for yieldably holding said water valve in its closed position.

References Cited in the file of this patent

UNITED STATES PATENTS

| 75,435 | Liddell | Mar. 10, 1868 |
| 229,985 | Everett | July 13, 1880 |
| 423,724 | Bemis | Mar. 18, 1890 |
| 653,425 | Moehring | July 10, 1900 |
| 855,787 | Kirn | June 4, 1907 |
| 871,354 | Morgan | Nov. 19, 1907 |
| 964,490 | Cartwright | July 19, 1910 |
| 999,321 | Leach | Aug. 1, 1911 |
| 1,073,702 | Owens | Sept. 23, 1913 |
| 1,141,503 | Street | June 1, 1915 |
| 1,145,439 | Rose | July 6, 1915 |
| 1,661,676 | Norquist | Mar. 6, 1928 |
| 1,697,952 | French | Jan. 8, 1929 |
| 1,886,457 | Winkley | Nov. 8, 1932 |
| 1,917,936 | Hartman | July 11, 1933 |
| 1,972,281 | Walling | Sept. 4, 1934 |
| 2,334,598 | Bateman et al. | Nov. 16, 1943 |
| 2,348,787 | Cordes | May 16, 1944 |
| 2,518,570 | Renault | Aug. 15, 1950 |
| 2,565,244 | Laurent | Aug. 21, 1951 |
| 2,637,263 | Schmitz | May 5, 1953 |
| 2,651,280 | Justiss et al. | Sept. 8, 1953 |

FOREIGN PATENTS

| 477,947 | France | Aug. 19, 1915 |
| 837,404 | France | Nov. 12, 1938 |
| 895,779 | France | Apr. 11, 1944 |
| 907,786 | France | July 23, 1945 |

OTHER REFERENCES

A-711-51-3 John Deere Plantrol Transplanter, received Aug. 30, 1951.